US006978474B1

(12) United States Patent
Sheppard et al.

(10) Patent No.: US 6,978,474 B1
(45) Date of Patent: Dec. 20, 2005

(54) MEDIA INTERFACE DEVICE

(75) Inventors: Steve Sheppard, Sebastopol, CA (US); William Weeks, Westcliffe, CO (US)

(73) Assignee: Next Level Communications, Inc, Rhonert Park, CA (US)

( * ) Notice: Subject to any disclaimer, the term of this patent is extended or adjusted under 35 U.S.C. 154(b) by 0 days.

(21) Appl. No.: 09/525,412

(22) Filed: Mar. 15, 2000

Related U.S. Application Data

(63) Continuation-in-part of application No. 09/488,275, filed on Jan. 20, 2000, which is a continuation of application No. 09/026,036, filed on Feb. 19, 1998, now Pat. No. 6,317,884.

(60) Provisional application No. 60/038,276, filed on Feb. 19, 1997.

(51) Int. Cl.$^7$ ............................................... H04N 7/18
(52) U.S. Cl. ........................................ 725/83; 725/127
(58) Field of Search ..................... 725/80–83, 127–129, 725/149

(56) References Cited

U.S. PATENT DOCUMENTS

| 5,521,631 | A | 5/1996 | Budow et al. ................... 348/6 |
| 5,574,964 | A | 11/1996 | Hamlin ........................ 455/3.1 |
| 5,610,916 | A | 3/1997 | Kostreski et al. ............. 370/69 |
| 5,613,190 | A | 3/1997 | Hylton ........................ 455/3.1 |
| 5,613,191 | A | 3/1997 | Hylton et al. ................. 455/3.1 |
| 5,628,055 | A | 5/1997 | Stein .......................... 455/89 |
| 5,630,204 | A | 5/1997 | Hylton et al. ................. 455/3.3 |
| 5,651,010 | A | 7/1997 | Kostreski et al. ............. 370/50 |
| 5,659,353 | A | 8/1997 | Kostreski et al. ............. 348/21 |
| 5,701,152 | A | 12/1997 | Chen ............................ 455/2 |
| 5,708,961 | A | 1/1998 | Hylton et al. .................. 348/6 |
| 5,715,020 | A | 2/1998 | Kuroiwa et al. ............ 348/734 |
| 5,729,279 | A | 3/1998 | Fuller ......................... 348/384 |
| 5,793,413 | A | 8/1998 | Hylton et al. ................. 348/12 |

(Continued)

FOREIGN PATENT DOCUMENTS

| WO | 9739483 | 8/1997 |

(Continued)

OTHER PUBLICATIONS

Residential Gateway Group publication, "The residential gateway", Oct. 1995, 8 pp.

(Continued)

*Primary Examiner*—John Miller
*Assistant Examiner*—Scott Beliveau
(74) *Attorney, Agent, or Firm*—Robert P. Marley

(57) ABSTRACT

A Residential Gateway (RG) for distributing video, data and telephone services to multiple devices within a residence is disclosed. The RG receives signals from a telecommunications network, converts the signals to formats compatible with the multiple devices, and transmits the appropriate signals to the appropriate devices. Wireless remote control devices (RCs) associated with remotely located televisions (TVs) transmit channel select commands to the RG as wireless signals. The wireless signals are received by Remote Antennae Packages (RAPs) coupled to the remotely located TVs. The RAPs transmit the wireless signals over coaxial cable to a Media Interface Device (MID) coupled to the RG. The MID extracts the channel select commands and forwards them to the RG. The MID is also capable of combining and splitting TV signals, and adjusting the impedance of network signals so that they can be transmitted over the coaxial cable.

4 Claims, 10 Drawing Sheets

U.S. PATENT DOCUMENTS

| | | | | |
|---|---|---|---|---|
| 5,805,591 | A * | 9/1998 | Naboulsi et al. | 370/395.6 |
| 5,828,403 | A | 10/1998 | DeRodeff et al. | 348/3.1 |
| 5,842,111 | A | 11/1998 | Byers | 348/10 |
| 5,901,340 | A * | 5/1999 | Flickinger et al. | 725/78 |
| 5,917,624 | A | 6/1999 | Wagner | 359/125 |
| 5,933,192 | A | 8/1999 | Crosby et al. | 348/10 |
| 5,936,660 | A | 8/1999 | Gurantz | 348/734 |
| 5,953,045 | A | 9/1999 | Tanishima | 348/10 |
| 6,049,693 | A * | 4/2000 | Baran et al. | 725/124 |
| 6,069,899 | A * | 5/2000 | Foley | 370/494 |
| 6,104,908 | A * | 8/2000 | Schaffner et al. | 725/78 |
| 6,108,331 | A * | 8/2000 | Thompson | 370/352 |
| 6,192,399 | B1 * | 2/2001 | Goodman | 725/78 |
| 6,202,211 | B1 * | 3/2001 | Williams, Jr. | 725/78 |
| 6,208,384 | B1 * | 3/2001 | Schultheiss | 348/552 |
| 6,286,142 | B1 * | 9/2001 | Ehreth | 725/78 |
| 6,317,884 | B1 | 11/2001 | Eames et al. | 348/6 |
| 6,418,149 | B1 * | 7/2002 | Swisher et al. | 370/487 |
| 6,481,013 | B1 * | 11/2002 | Dinwiddie et al. | 725/80 |
| 6,493,875 | B1 * | 12/2002 | Eames et al. | 725/81 |
| 6,536,042 | B1 * | 3/2003 | Paul | 725/69 |
| 6,622,304 | B1 * | 9/2003 | Carhart | 725/74 |

FOREIGN PATENT DOCUMENTS

| | | | | |
|---|---|---|---|---|
| WO | IB-WO 97/39483 A1 | 10/1997 | | |
| WO | WO 9837648 A1 * | 8/1998 | | H04N 1/02 |

OTHER PUBLICATIONS

Generic Requirement, Bellcore, "Active Network Interface Device (Residential Gateway)," GR-2890-CORE, issue 2, Nov. 1996, 19 pp.

Specifications, GTE, "The residential gateway functional specifications," printed from the World Wide Web site http://info.gte.com/gtel/sponsored/rg/webspec.htm on Jul. 24, 1996, 6 pp.

Co-pending U.S. Appl. # 09/526,100, filed on Mar. 15, 2000.
Co-pending U.S. Appl. # 09/525,488, filed on Mar. 15, 2000.
Co-pending U.S. Appl. # 09/488,275, filed on Jan. 20, 2000.
Co-pending U.S. Appl. # 09/026,038, filed on Feb. 19, 1998.
Co-Pending Related U.S. Appl. No. 09/612,562, Title: Wireless and xDSL Residential Gateway and System, Filed: Jul. 7, 2000.

* cited by examiner

MEDIA INTERFACE DEVICE

This application is a continuation-in-part (CIP) of, and claims the benefit under 35 U.S.C. §120 of, co-pending U.S. patent application Ser. No. 09/488,275, filed Jan. 20, 2000, which was a continuation of U.S. patent application Ser. No. 09/026,036, filed on Feb. 19, 1998 (now U.S. Pat. No. 6,317,884), which claimed priority to U.S. provisional patent application No. 60/038,276, filed on Feb. 19, 1997.

FIELD OF THE INVENTION

The present invention relates to an apparatus and method for the distribution of video, data, telephone and other telecommunications services from a single point to multiple devices within a residence.

BACKGROUND OF THE INVENTION

Advances in the field of telecommunications allow large amounts of digital information to be delivered to a residence. Digital telecommunications networks (access systems), such as Hybrid-Fiber-Coax (HFC), Fiber-to-the-Curb (FTTC), and Digital Subscriber Line (DSL), can provide both traditional telecommunications services such as Plain Old Telephone Service (POTS) as well as advanced services such as Switched Digital Video (SDV) and high-speed data access. Devices inside the residence, will be connected to the network by twisted wire pairs which provide telephone services today, or by coaxial cable similar to that used by cable operators to provide cable television (TV) services. Because of this range of services, it is likely that digital networks will be widely deployed. In a widespread deployment of digital networks, millions of homes will connect to the digital networks.

Because the majority of new video services will be digital, and because existing TVs are analog, there is a need for a device, hereinafter referred to as a Residential Gateway (RG), to convert the digital signals supplied by the network to analog signals compatible with existing TVs. Furthermore, there is a need for the RG to act as an interface subsystem for each device connected to the digital network. For example, the RG needs to act as a Premises Interface Device (PID) to extract time division multiplexed information and generate a telephone signal, and an Ethernet Bridge or Router (EBR) to generate a signal compatible with a computer.

Numerous connectors may be required as multiple devices are connected to the RG and will transmit signals to and from the RG. Thus, there is a need for an apparatus that combines multiple devices and connections into a single device so as to simplify the installation of the RG.

SUMMARY OF THE INVENTION

The present invention discloses a method and an apparatus for receiving signals from a telecommunications network, decoding the signals, and transmitting the decoded signals to a plurality of devices. In a preferred embodiment, the telecommunications network is a digital network and the signals include video signals, and may possibly include telephone signals, computer signals, and signals for other devices. In a preferred embodiment, the plurality of devices includes multiple televisions and may possibly include telephones, computers and other devices. The apparatus is commonly known as a Residential Gateway (RG).

In one embodiment, a method of receiving, decoding and distributing video signals from a telecommunications network to a plurality of televisions locatable in at least two separate locations within a residential environment via a RG is disclosed. The method includes receiving at least one channel select command from one of a plurality of remote control devices associated with a respective one of the plurality of televisions. At least a first one of the plurality of remote control devices transmits the channel select command directly to a receiver within the RG. A video signal is received from the telecommunications network and transported over a video bus to a video processor. The video signal is processed to produce at least one television signal corresponding to the at least one channel select command. The at least one television signal is then transmitted to the at least one television.

According to one embodiment, a RG for distributing video signals to a plurality of televisions locatable within at least two separate locations in a residential environment is disclosed. The RG includes a receiver for directly receiving channel select commands from remote control devices associated with the televisions. A network interface module receives signals, including video signals, from a telecommunications network, wherein the received video signals correspond to the channel select commands. A video processor processes the video signals to produce at least one television signal. A video bus transports the video signals to the plurality of video processors.

According to one embodiment, a method for receiving and decoding signals from a telecommunications network at a RG, and transmitting decoded signals from the RG to a plurality of devices including multiple televisions is disclosed. The method includes connecting each of the plurality of devices and the telecommunications network to the RG so that all communications between the devices and the telecommunications network must pass through the RG. A television channel is selected to view for at least one of the multiple televisions by programming an associated remote control device to transmit a channel select command. The channel select commands are received by a receiver within the RG. The at least one channel select command is transmitted to the telecommunications network. A video signal is received from the telecommunications network. The video signal is processed into at least one television signal corresponding to the at least one channel select command. The at least one television signal is then transmitted to the appropriate television.

According to one embodiment, a method for receiving and decoding signals from a telecommunications network at a RG, and transmitting the decoded signals from the RG to a plurality of devices including multiple televisions is disclosed. The method includes connecting the RG to the telecommunications network and to at least one television that is remotely located from the RG. A television channel is selected to view for the at least one television by programming associated wireless remote control devices. The wireless remote control devices transmit channel select commands as wireless signals to remote antennae packages connected to the at least one television. The remote antennae packages receive the wireless signals and transmit the wireless signals over media to a media interface device which demodulates the wireless signals and extracts the portion corresponding to the channel select commands. The channel select commands are received from the telecommunications network and processed to produce television signals corresponding to the channel select commands. The television signals are then transmitted to the at least one television.

According to one embodiment, a RG for receiving and decoding signals from a telecommunications network and transmitting the decoded signals to a plurality of devices including multiple televisions is disclosed. The RG includes a network interface module for transmitting upstream signals, including channel select commands, to the telecommunications network and receiving downstream signals, including video signals, from the telecommunications network. A video processor processes the video signals into at least one television signal corresponding to at least one channel select command and transmits the at least one television signal to the corresponding television. A remote control module processes the channel select commands. At least one of the channel select commands is extracted from a wireless signal transmitted from a wireless remote control device. The wireless signal received by a remote antennae package connected to the associated television and transmitted over media to a media interface device which demodulates the wireless signal and extracts the portion corresponding to the channel select command.

According to one embodiment, a RG for receiving and decoding signals from a telecommunications network and transmitting the decoded signals to a plurality of devices including multiple televisions is disclosed. The RG includes a network interface module for transmitting upstream signals, including channel select commands, to the telecommunications network and receiving downstream signals, including video signals, from the telecommunications network. A video processor decodes the video signals into at least one television signal corresponding to at least one channel select command and transmits the at least one television signal to the corresponding television. A remote antennae package, located in close proximity to and connected to a remotely located television receives a wireless signal, including a channel select command, from a wireless remote control device associated with the remotely located television and modulates the wireless signal over media. A media interface device (MID), connected to the media and the RG, demodulates the wireless signal, extracting the portion corresponding to the channel select command, and transmitting the channel select command to the RG.

According to one embodiment, a MID for directional distribution of signals to multiple devices over media is disclosed. The MID includes a first connector for receiving a first signal in a first direction, a second connector for receiving a second signal in the first direction and transmitting a third signal in a second direction, a third connector for transmitting the first signal and the second signal over the media in the first direction and receiving the third signal and a fourth signal over the media in the second direction, a diplexer for extracting the third signal from the media in the second direction and inserting the second signal onto the media in the first direction, a remote antennae module for receiving the fourth signal and extracting a fifth signal therefrom, and a fourth connector for transmitting the fifth signal in the second direction.

According to one embodiment, a MID for connecting to a RG and distributing signals to and from the RG over media is disclosed. The MID includes a first connector for receiving multiple signals (i.e., wireless signals from wireless remote control devices associated with remotely located TVs and downstream network signals) over the media, and for transmitting multiple signals (i.e., TV signals and upstream network signals) over the media. A second connector receives the TV signals from the RG on the media and a third connector receives the upstream network signals from the RG and transmits the downstream network signals to the RG. A diplexer, connected to the first connector, extracts the downstream network signals from the media and inserts upstream network signals onto the media. A balun, connected to the diplexer, adjusts the impedance of the upstream network signals so they can be inserted onto the media by the diplexer, and adjusts the impedance of the downstream network signals so they can be processed by the RG. A remote antennae module, connected to the diplexer, extracts the channel select commands from the wireless signals and transmits the channel select commands to the RG.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

Figure 1:
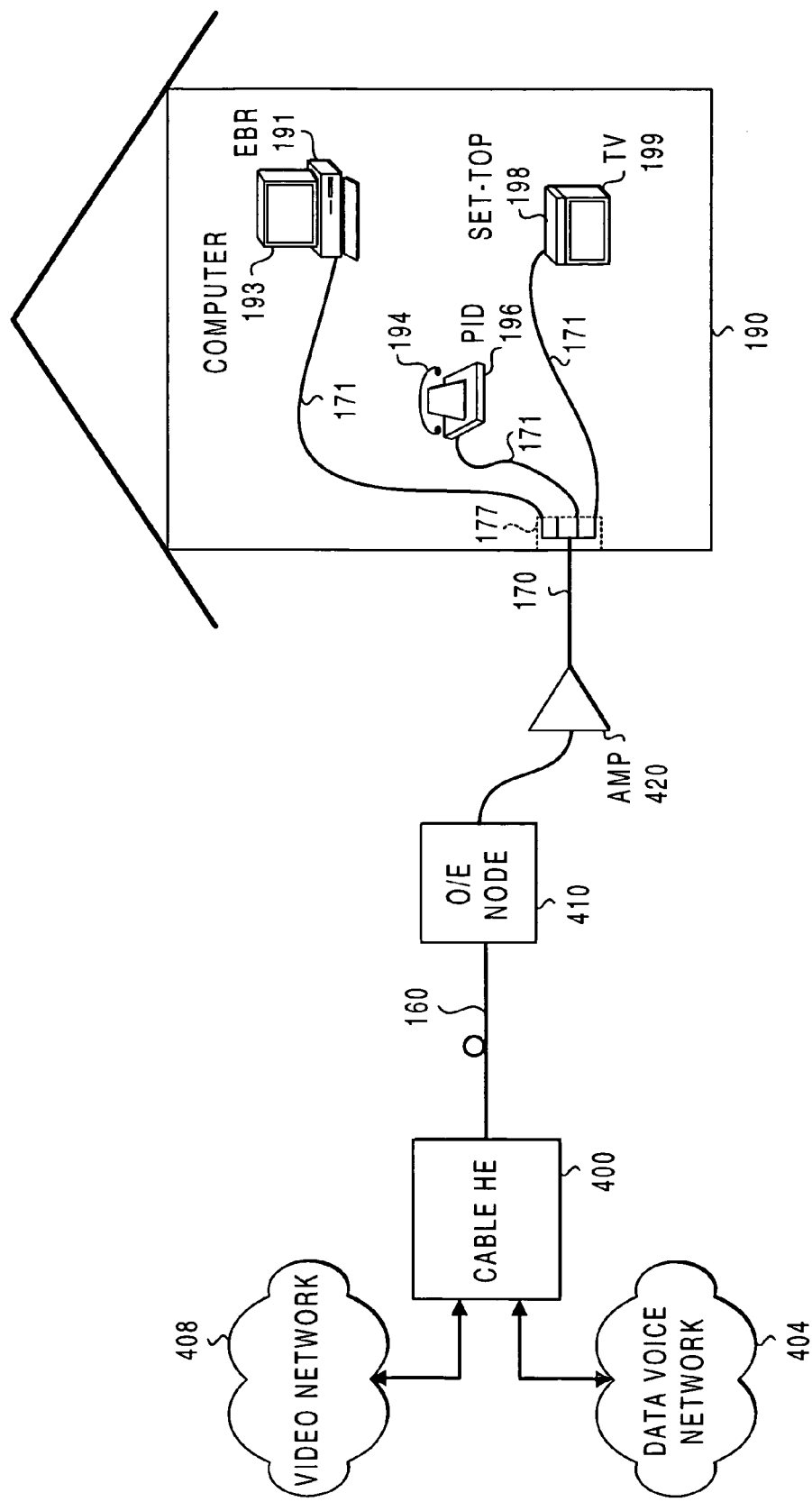
FIG. 1 illustrates a Hybrid-Fiber-Coax (HFC) access system.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the method and apparatus of the present invention are disclosed.

FIG. 1 illustrates a Hybrid-Fiber-Coax (HFC) digital network in which various devices within a residence 190 are connected to a Video Network (VN) 408 and/or a Data and Voice Network (DVN) 404. The devices in the residence 190 can include a Premises Interface Device (PID) 196 connected to a telephone 194, a television (TV) set-top converter 198 connected to a TV 199, a Ethernet Bridge or Router (EBR) 191 connected to a computer 193, or other devices. A cable Head End (HE) 400 is connected upstream to the DVN 404 and the VN 408. The physical interface to the DVN 404 may be copper wire pairs carrying either Digital Signal (DS)-1 or DS-3 signals. The physical interface to the VN 408 may be via a wide area network (WAN).

The cable HE 400 is connected downstream to a plurality of optical to electrical (O/E) nodes 410 (only one illustrated) with fiber optic cables 160. The O/E nodes 410 are located within the communities serviced by the HFC network. Each O/E node 410 provides service for up to 500 residences within the given community. Since such a large number of users are being serviced by one O/E node 410, amplifiers 420 are required. The O/E node 410 connects to the residence 190 via coaxial cable 170. The coaxial cable 170 is received by a splitter 177 within the residence 190 so that internal coaxial wiring 171 can route the data being transmitted to the various devices. Each device connected to the internal coaxial wiring 171 will require an interface sub-system which can convert the current format of the signal being transmitted over the internal coaxial wiring 171 to the service interface required by the devices (i.e., telephone, TV, computer, or other devices). In a preferred embodiment, the PID 196 extracts time division multiplexed information carried on the internal coaxial wiring and generates a telephone signal compatible with the telephone 194. Similarly, the TV set-top 198 converts digital video signals to analog signals compatible with the TV 199. Likewise, the EBR 191 generates a signal compatible with the computer 193.

Figure 2:
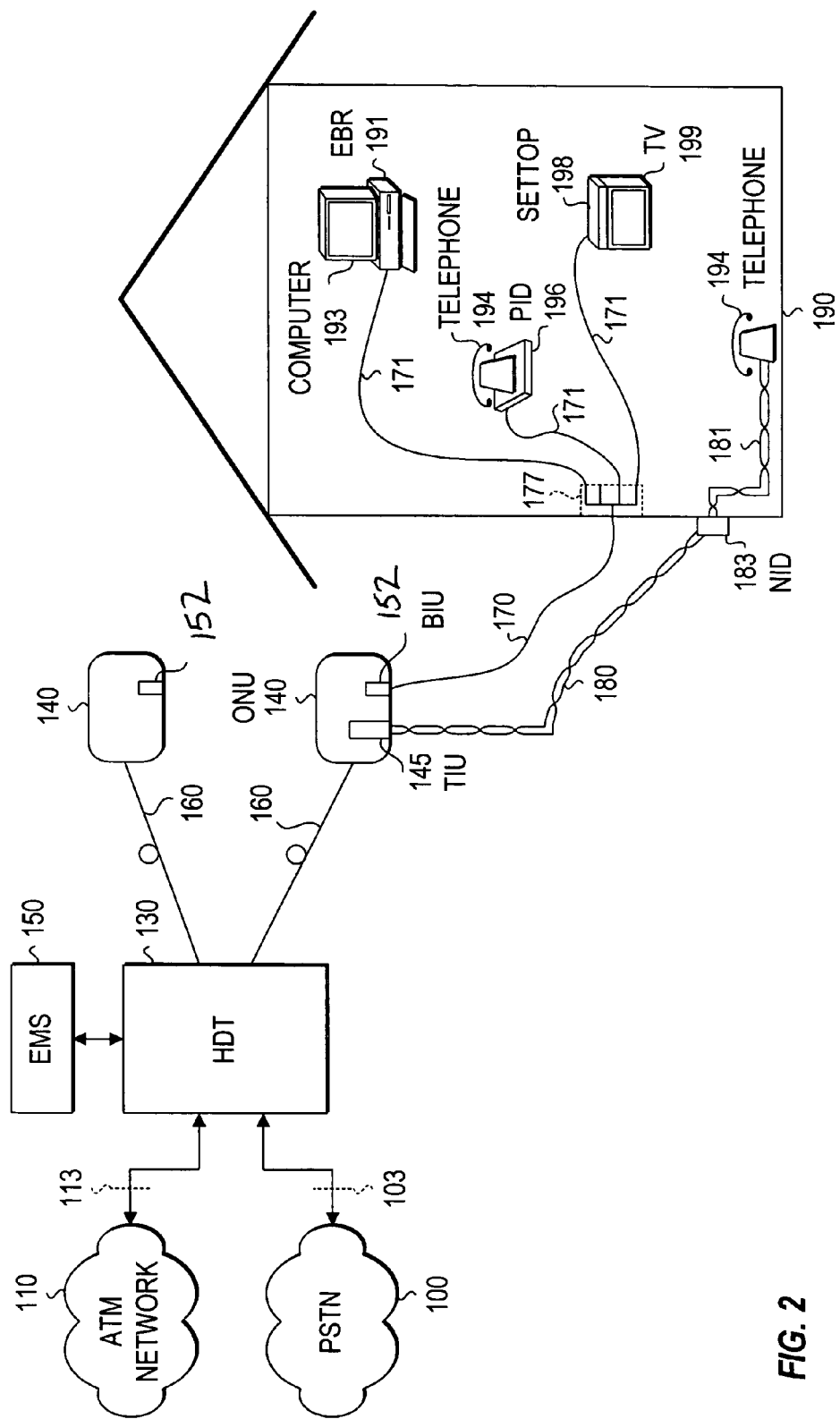
FIG. 2 illustrates a Fiber-To-The-Curb (FTTC) access system.

FIG. 2 illustrates a Fiber-to-the-Curb (FTTC) network in which various devices in the residence 190 are connected to a Public Switched Telecommunications Network (PSTN) 100 or an Asynchronous Transfer Mode (ATM) network 110. The devices in the residence 190 can include telephones 194 (with or without a PID 196), TV 199 with a TV set-top 198, and computer 193 with an EBR 191. In the FTTC network, a Host Digital Terminal (HDT) 130 is connected to the PSTN 100 and the ATM network 110.

A PSTN-HDT interface 103 is specified by standards bodies, such as Bellcore specifications TR-TSY-000008, TR-NWT-000057 or GR-NWT-000303. The Bellcore standards are incorporated herein by reference. The HDT 130 can also receive special service signals from private or non-switched public networks. The physical interface to the PSTN 100 may be twisted wire pairs carrying DS-1 signals, or optical fibers carrying Optical Carrier (OC)-3 optical signals. An ATM network-HDT interface 113 can be realized using an OC-3 or OC-12c optical interface carrying ATM cells. In a preferred embodiment, the HDT 130 has three OC-12c broadcast ports, which receive signals carrying ATM cells, and one OC-12c interactive port which receives and transmits signals.

An element management system (EMS) 150 is connected to the HDT 130 and forms part of an Element Management Layer (EML) which is used to provision services and equipment on the FTTC network, in the central office where the HDT 130 is located, in the field, or in the residences 190. The EMS 150 is software based and can be run on a personal computer in which case it will support one HDT 130 and the associated digital network equipment connected to it, or can be run on a workstation to support multiple HDTs 130 and the associated digital network equipment.

Optical Network Units (ONUs) 140 are located in the serving area and are connected to the HDT 130 via optical fiber 160. Digital signals, having a format which is similar to the Synchronous Digital Hierarchy (SDH) format, are transmitted to and from each ONU 140 over the optical fiber 160 at a rate of at least 155 Mb/s, and preferably 622 Mb/s. In a preferred embodiment, the optical fiber 160 is a single-mode fiber and a dual wavelength transmission scheme is used to communicate between the ONU 140 and the HDT 130. In an alternate embodiment, a single wavelength scheme is used in which low reflectivity components are used to permit transmission and reception on one fiber.

A Telephony Interface Unit (TIU) 145 in the ONU 140 generates analog Plain Old Telephone Service (POTS) signals which are transported to the residence 190 via a twisted wire pair, drop line cable 180. At the residence 190 a Network Interface Device (NID) 183 provides for high-voltage protection and serves as the interface and demarcation point between the twisted wire pair, drop line cable 180 and the twisted wire pairs 181 internal to the residence 190. In a preferred embodiment, the TIU 145 generates POTs signals for six residences 190, each having a separate twisted wire pair, drop line cable 180 connected to the ONU 140.

A Broadband Interface Unit (BIU) 152 is located in the ONU 140 and generates broadband signals which contain video, data and voice information. The BIU 152 modulates data onto a RF carrier and transmits the data to the residence 190 over media 170, such as a coaxial, drop line cable or a twisted wire pair, drop line cable. FIG. 2 illustrates the media 170 as the coaxial drop line cable. The media 170 connects to the residence 190 at a splitter 177. The data then travels from the splitter 177 to the devices within the residence 190 over coaxial wiring 171 internal to the residence 190. Each device connected to the internal coaxial wiring 171 will require an interface sub-system which can convert the current format of the signal being transmitted over the internal coaxial wiring 171 to the service interface required by the devices (i.e., telephone 194, TV 199, computer 193, or other devices).

In a preferred embodiment, 64 ONUs 140 are served by each HDT 130 and each ONU 140 serves 8 residences 190. In an alternate embodiment, each ONU 140 serves 16 residences 190.

As illustrated in FIG. 2, the NID 183 is located external to the residence 190, at what is known in the industry as the network demarcation point. For the delivery of telephone services the NID 183 is a passive device whose principal functions are lightning protection and the ability to trouble-shoot the network by allowing connection of a telephone 194 to the twisted wire pair, drop line cable 180 to determine if wiring problems exist on the internal twisted wire pairs 181.

Figure 3:
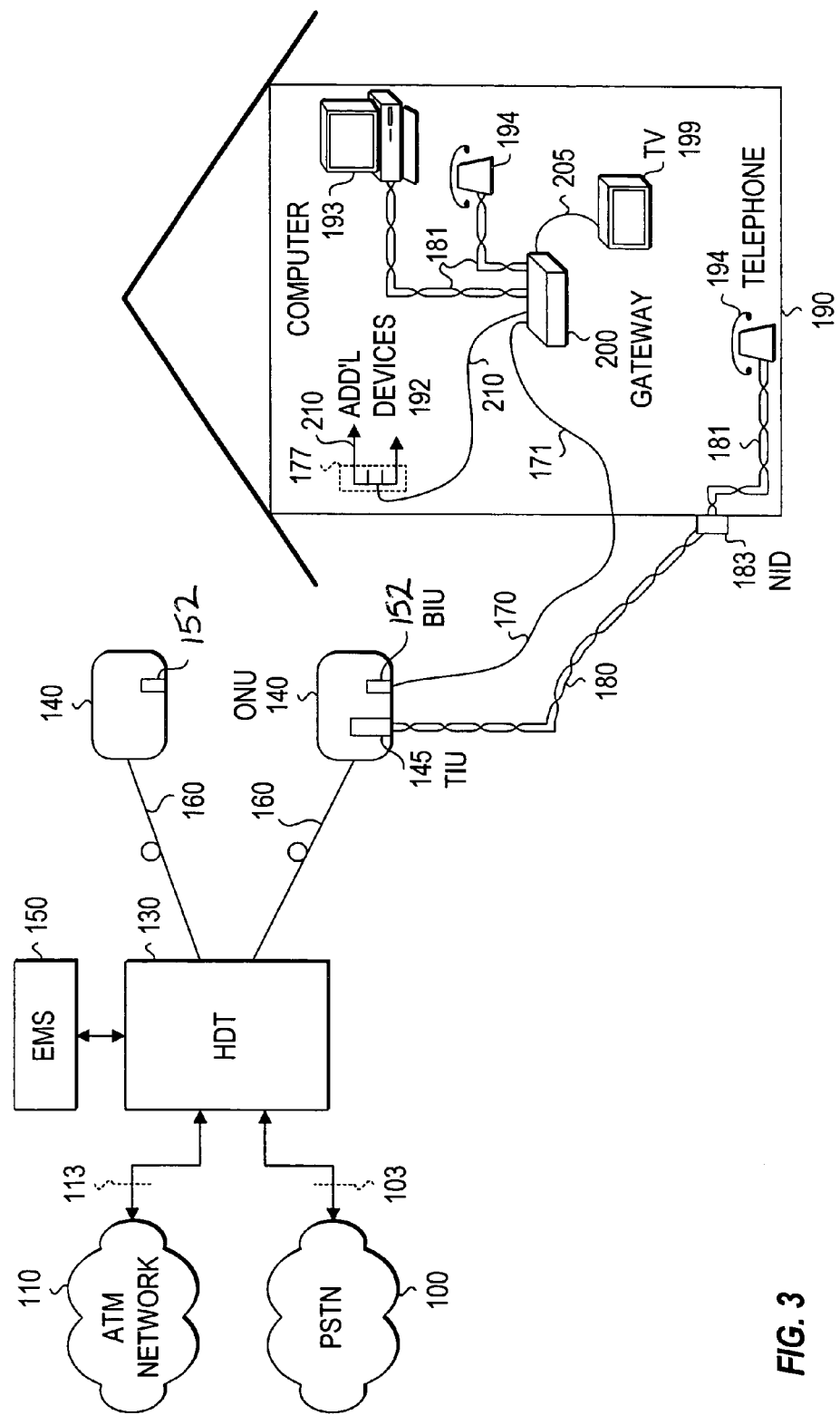
FIG. 3 illustrates an FTTC access system including a Residential Gateway (RG), according to one embodiment.

FIG. 3 illustrates a residential gateway (RG) 200 located within the residence 190. In the embodiment illustrated, the digital network is an FTTC network and the media 170 is a coaxial, drop line cable for connecting to and communicating with the RG 200. The RG 200 generates signals compatible with the devices (i.e., telephone 194, TV 199, and the computer 193) in the residence 190, thus reducing the number of interface sub-systems required. For example, the computer 193 does not need the EBR 191, the telephone 194 does not need the PID 196, and the TVs 199 do not require the set-top converters 198. Moreover, in a preferred embodiment, the RG 200 can produce TV signals as S-video signals and transmit the S-video signals to a TV 199 located in close proximity to the RG 200 using S-video cables 205.

Additional devices 192, such as additional TVs 199, which are remotely located from the RG 200 (hereinafter referred to as remotely located TVs 199) may be connected to the RG 200. In one embodiment, each of the remotely located TVs 199 may be connected to the RG 200 via media 210, such as internal coaxial cable, and the splitter 177 (this type of connection is known as a point-to-multipoint connection). In another embodiment, each remotely located TV 199 may be directly connected to the RG 200 with the media 210 (this type of connection is known as a point-to-point connection).

Figure 4:
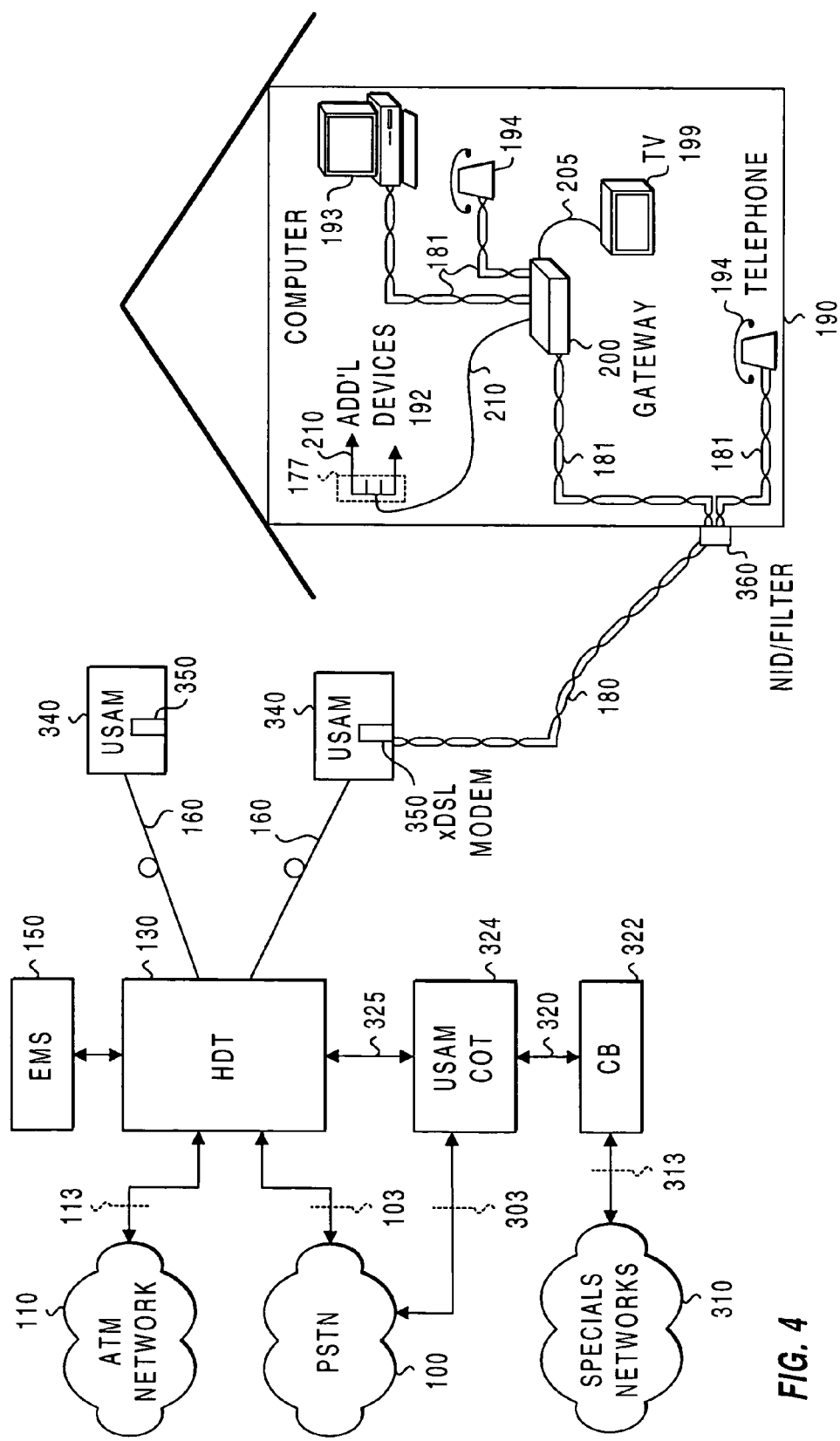
FIG. 4 illustrates a Digital Subscriber Line (DSL) access system including an RG, according to one embodiment.

FIG. 4 illustrates an embodiment, in which the digital network is a Digital Subscriber Line (DSL) network. In this embodiment, the ONU 140 is replaced with a Universal Service Access Multiplexer (USAM) 340. The USAM 340 is located in the serving area, and is connected to the HDT 130 via optical fiber 160. A twisted wire pair, drop line cable 180 provides communications to and from the RG 200.

The USAM 340 includes a xDSL modem 350 which provides for the transmission of high-speed digital data to and from the residence 190, over the twisted wire pair, drop line cable 180. When used herein, the term xDSL refers to any one of the twisted wire pair digital subscriber loop transmission techniques including High speed Digital Subscriber Loop (HDSL), Asymmetric Digital Subscriber Loop (ADSL), Very high speed Digital Subscriber Loop (VDSL), Rate Adaptive Digital Subscriber Loop (RADSL), or other similar twisted wire pair transmission techniques. Such transmission techniques are known to those skilled in the art. The xDSL modem 350 contains the circuitry and software to generate a signal which can be transmitted over the twisted wire pair, drop line cable 180, and which can receive high speed digital signals transmitted from the RG 200 or other devices connected to the subscriber network.

Traditional analog telephone signals are combined with the digital signals for transmission to the residence 190. A NID/filter 360 replaces the NID 183 of FIGS. 2 and 3, and is used to separate the analog telephone signals from the digital signals. The majority of xDSL transmission techniques leave the analog voice portion of the spectrum (from approximately 400 Hz to 4,000 Hz) undisturbed. The analog telephone signal, once separated from any digital data signals in the spectrum, is sent to the telephone 194 over the internal twisted wire pairs 181. The digital signals that are separated at the NID/filter 360 are sent from a separate port on the NID/filter 360 to the RG 200. The RG 200 serves as the interface to the other devices (TVs 199, computers 193, and additional telephones 194) in the residence 190.

The embodiment illustrated in FIG. 4 is a central office configuration, which includes a USAM Central Office Terminal (COT) 324 connected to the HDT 130. A USAM COT-HDT connection 325, is a twisted wire pair which transmits a STS3c signal in a preferred embodiment. A PSTN-USAM COT interface 303 is one of the Bellcore specified interfaces including TR-TSY-000008, TR-NWT-000057 or TR-NWT-000303, which are all incorporated herein by reference. The USAM COT 324 has the same mechanical configuration as the USAM 340 in terms of power supplies and common control cards, but has line cards which support twisted wire pair interfaces to the PSTN 100 (including DS-1 interfaces) and cards which support STS3c transmission over the twisted wire pair of the USAM COT-HDT connection 325.

A Channel Bank (CB) 322 is used to connect special networks 310, comprised of signals from special private or public networks, to the DSL network via a special networks-CB interface 313. In a preferred embodiment, a CB-USAM COT connection 320 includes DS1 signals over twisted wire pairs.

The RG 200 of FIGS. 3 and 4 can be located anywhere within the residence 190 (i.e., in any of the living spaces, in the basement, in the garage, in a wiring closet, in the attic), or external to the residence (i.e., on an external wall). For external locations, the RG 200 will require a hardened enclosure and components which work over a larger temperature range than those used for the RG 200 located internal to the residence 190. Techniques for developing hardened enclosures and selecting temperature tolerant components are known to those skilled in the art.

Figure 5:
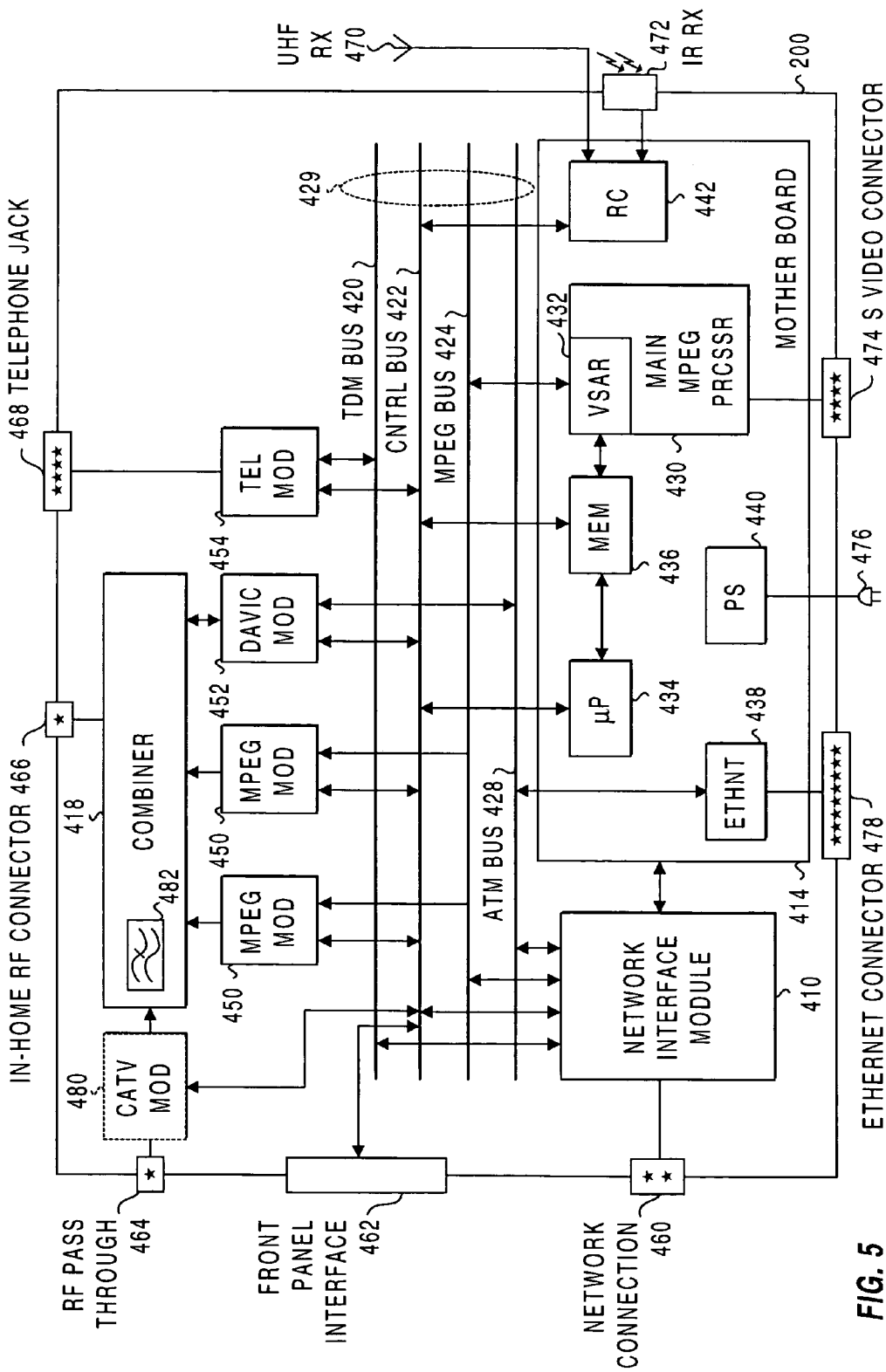
FIG. 5 illustrates an RG architecture, according to one embodiment.

FIG. 5 illustrates one embodiment of the RG 200. The RG 200 includes a network connection 460 for connecting to the digital network. The network connection 460 will vary depending on the digital network that the RG is connecting to. That is, the network connection 460 will depend on whether the digital network for the area the residence 190 is located within is an FTTC network, a DSL network, or other type of digital network. For example, if the drop line from the digital network to the RG 200 is a coaxial cable (i.e., the FTTC network of FIG. 3) the network connection 460 should be a coaxial cable connector. If the drop line from the digital network to the RG 200 is twisted wire pair cable (i.e., the DSL network of FIG. 4) the network connection 460 should be a connector capable of receiving twisted wire pairs, such as a telephone jack. As one skilled in the art would know, the network connection 460 could be various different types of connectors as long as the connector is capable of receiving the signals being transmitted over the drop line from the digital network.

The network connection 460 is connected to a Network Interface Module (NIM) 410. The NIM 410 receives all data from and transmits all data to the digital network and thus contains the appropriate modem technology. As with the network connection 460, the type of NIM 410 utilized depends on the type of digital network that the RG 200 is connected to (i.e., the FTTC network of FIG. 3, the DSL network of FIG. 4, or other types of digital networks). Regardless of the type of NIM 410 utilized, the NIM 410 interfaces to a mother board 414 which provides the basic functionality of the RG 200.

The mother board 414 may contain a microprocessor 434, memory 436, a power supply 440, a main MPEG processor 430, an Ethernet processor 438, and a Remote Control (RC) processor 442. As one skilled in the art would recognize, the mother board 414 could contain additional components, or some of the components illustrated as being part of the mother board 414 could removed from or located elsewhere within the RG 200, without departing from the scope of the current invention.

The RG 200 receives power from a power source, which in a preferred embodiment is an AC outlet, via a plug 476, which in a preferred embodiment is an AC plug. The power supply 440 converts the voltage from the AC outlet, for example 120 volts AC in a typical residence 190, to the voltages necessary for each of the components of the RG 200 to operate. The power supply 440 is illustrated as being an element of the mother board 414, but as one skilled in the art would know, the power supply 440 could be a separate component within the RG 200.

The microprocessor 434 controls the operation of the RG 200. For example, the microprocessor 434 may control the transfer of data between each of the elements of the RG 200. The memory 436 may store operating programs required by the microprocessor 434, data received from the digital network or any of the devices in the residence 190 connected to the RG 200, or other data or programs required by the RG 200.

The Ethernet processor 438 converts ATM cells received by the NIM 410 into the appropriate form for transmission to the devices, such as the computers 193. The computers 193 are connected to the RG 200 via an Ethernet connector 478 located in the housing of the RG 200. As illustrated in FIG. 5, the RG 200 has only one Ethernet connector 478.

However, this is in no way intended to limit the current invention to an RG 200 that can only connect to one computer 193. That is, as one skilled in the art would know, multiple computers 193 could be connected to the RG 200 by using a splitter, adding Ethernet connectors 478 to the RG 200, or by other methods.

Within the main MPEG processor 430 there is a Video Segmentation and Re-assembly (VSAR) module 432 which constructs Motion Picture Experts Group (MPEG) packets from an ATM stream received from the NIM 410. In addition to constructing the MPEG packets, the VSAR module 432 can reduce jitter in the MPEG packets which arises from transmission of those packets over the ATM network 110, as well as constructing a useable MPEG stream in spite of lost ATM cells which contain partial MPEG packets. It would be obvious to one skilled in the art that the VSAR module 432 does not have to be part of the main MPEG processor 430. For example, the VSAR module 432 could be its own module on the mother board 414, could be its own subassembly, or could be part of another processor, such as the NIM 410.

While the VSAR module 432 has been described as constructing MPEG packets from received ATM streams, this is in no way intended to limit the scope of the invention. Rather, this is simply one of the preferred embodiments. That is, one preferred method for transmitting digital data over the digital network is in ATM streams, and one preferred method for encoding digital video data is an MPEG standard (currently the MPEG-2 standard). It is within the scope of the current invention to receive digital data from a digital network in any format and for the video data to be encoded in any format. That is, one skilled in the art could modify the VSAR module 432 to handle new transmission or encoding formats without departing from the scope of the current invention.

The main MPEG processor 430 can also decompress the MPEG packets, which are constructed by the VSAR module 432, to generate video signals compatible with present TVs 199. In one embodiment, the main MPEG processor 430 generates a video signal that has an S-video format. The S-video signal can be transmitted over an S-video connector 474 to a TV 199 having an S-video port via an S-video cable 205. As one skilled in the art knows, the S-video signals are a higher quality video signal because the chrominance and luminance information are separated. The TV 199 receiving the S-video signals should be located in close proximity to the RG 200 to ensure the quality of the S-video signal.

In one embodiment, the main MPEG processor 430 may decompress multiple MPEG packets corresponding to multiple TV channel selections. For example, the main MPEG processor 430 may decompress three video streams simultaneously to generate three video signals associated with three TV channel selections. The video signals are compatible with the current TV format, which in the U.S. is currently the National TV System Committee (NTSC) format. The invention however is not limited to the NTSC format. It is well within the scope of the current invention for the TV signals to be generated in accordance with the current standard for the time, whether it be the NTSC format or a new format. The TV signals may be combined and modulated over a single media or each TV signal may be modulated over its own media.

The RC processor 442 is capable of processing RC signals received by the RG 200. For example, in the embodiment illustrated in FIG. 5, the RC processor 442 receives optical signals from an optical receiver 472, such as an infrared (IR) receiver, and wireless signals from a wireless receiver 470, such as a UHF receiver, within the RG 200. One skilled in the art would recognize that the RC processor 442 could be designed to handle any type of channel select signals received by the RG 200. Moreover, one skilled in the art would recognize that the RC processor 442 is not limited to the illustrated configuration of being a module located on the mother board 414. For example, the RC processor 442 could be located on another board or could be incorporated as part of another module.

The embodiment of the RG 200 illustrated in FIG. 5, further includes the optical receiver 472. The optical receiver 472 receives channel select commands from an optical RC associated with the TV 199 that is in close proximity to the RG 200, and in a preferred embodiment is directly connected to the RG 200 via the S-video port 474. In a preferred embodiment, the RG 200 is treated like a VCR and is either located in a stereo cabinet with the TV 199 or on top of the TV 199. As with a VCR, the TV 199 would be set to a particular channel, for example channel 3 or 4 just like a VCR, and the control of the channel selection for the TV 199 would then be controlled by the optical RC sending channel select commands to the RG 200 directly.

The embodiment of the RG 200 illustrated in FIG. 5, further includes the wireless receiver 470 for receiving channel select signals from the remotely located TVs 199 (i.e., located in separate rooms or even separate floors of the residence 190). The remotely located TVs 199 would be set to a particular channel, for example channel 3 or 4 just like a VCR, and the channel selection for the remotely located TVs 199 would then be controlled by a wireless RC associated with each remotely located TV 199. The wireless RC transmits the channel select commands directly to the wireless receiver 470 within the RG 200.

Figure 6:
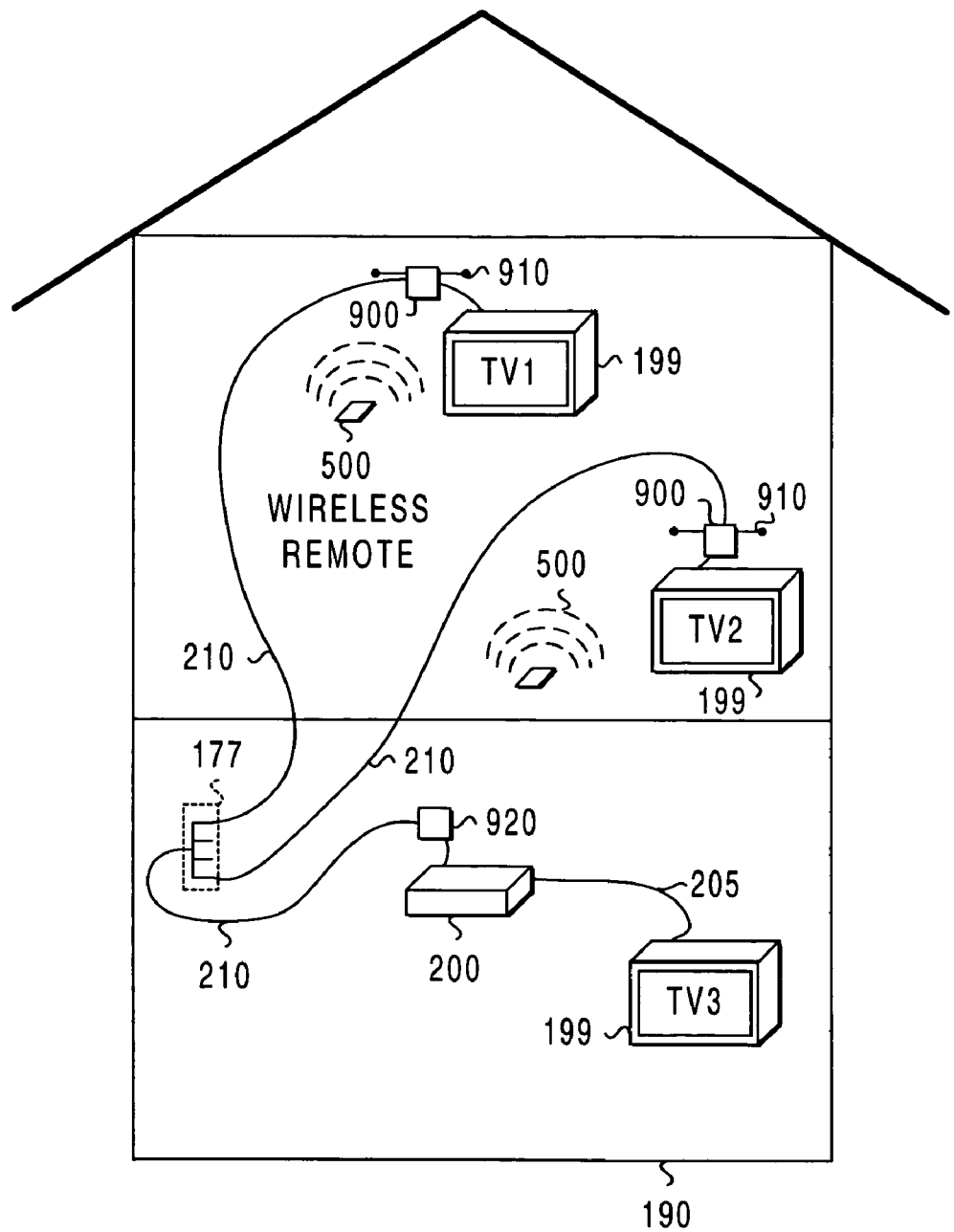
FIG. 6 illustrates the operation of the RG within the residence, according to one embodiment.

The RG 200 also includes a set of buses 429 used to route information within the RG 200. As illustrated in FIG. 6 the set of buses 429 includes a Time Division Multiplexing (TDM) bus 420, a control bus 422, a MPEG bus 424, and an ATM bus 428.

The RG 200 may also include a number of optional modules which can be inserted into the RG 200. The optional modules include MPEG modules 450, a Digital Audio Visual Council (DAVIC) module 452, and a telephone module 454. All of the optional modules are connected to the control bus 422 in addition to being connected to at least one other bus which provides those modules with the appropriate types of data for the services supported by the module.

The MPEG modules 450 provide for decompression of MPEG packets which are constructed by the VSAR processor 432. The MPEG modules are associated with remotely located TVs 199. As with the output of the main MPEG processor 430, the output of the MPEG modules 450 is a signal having a format compatible with present TVs 199. The MPEG modules 450 can modulate the decompressed analog format video signal onto an available channel for transmission to the remotely located TVs 199 in the residence 190. In a preferred embodiment, the MPEG modules 450 are insertable cards. Thus, the cards could be added after an initial installation to handle additional TVs 199. For example, in one embodiment the main MPEG processor 430 may be capable of generating three TV signals so that the RG 200 can accommodate three TVs 199 without the need for any MPEG modules 450. If a fourth TV 199 was added, or one of the TVs 199 had picture-in-picture, a MPEG module 450 would be required to generate a fourth TV signal.

The DAVIC module 452 is for communicating with devices that have a signal format that is compatible with a signal format received from the digital network. That is, the DAVIC module transmits ATM signals to and receives ATM signal from these devices. Thus, the DAVIC module 452 allows the RG 200 to act as a pass through for these devices. These devices may include the interface sub-systems illustrated in FIGS. 1 and 2. This is beneficial because the RG 200 can be used in conjunction with previously purchased interface sub-systems if required or desired.

As illustrated in FIG. 5, the MPEG modules 450 and the DAVIC module 452 are connected to a combiner 418 which combines the RF signals from those modules. It should be noted that this embodiment has only one RF connector 466 so that the combiner 418 is necessary to combine all the TV signals and ATM signals so they can be transmitted over a single media 210, such as one coaxial cable, connected to the RF connector 466. If multiple RF connectors 466 were provided, it is possible that the combiner 418 would not be required. Moreover, the combiner 418 could be located external to the RG 200. However, the combiner 418 can also add other RF signals, such as off-air broadcast television signals or Community Antenna Television (CATV) signals supplied by a cable television company. Signals from the antenna or cable system are coupled to the RF pass-through 464, which in a preferred embodiment is an F-connector. A low pass filter 482 is used in the combiner 418 to insure that the frequencies used by MPEG modules 450 are available. The output of the combiner 418 is connected to the RF connector 466, which in a preferred embodiment is an F-connector.

An optional CATV module 480 can be inserted into the RG 200 to allow for mapping of off-air or cable video channels from their original frequencies to new frequencies for in-home distribution. The RC processor 442 can control the channel selection and mapping via the control bus 422 which is connected to the CATV module 480. Either a hand-held optical RC or a wireless RC can be used to change the channel mapping of the CATV module 480.

The RG 200 includes a front panel interface 462, which provides for connectivity between the front panel controls (buttons) and the microprocessor 434. Through the front panel controls, the user can make channel changes as well as changing the configuration of the channels transmitted on the in-home coaxial network.

The RG 200 also includes a telephone module 454, which transmits and receives information from the TDM bus 420 and produces an analog telephone signal which is compatible with telephones 194. The interface for the telephones 194 is a telephone jack 468, which in a preferred embodiment is an RJ-11 jack.

FIG. 6 illustrates an embodiment in which the wireless signals from the wireless RCs are transmitted over media 210, such as coaxial cable, connecting the TV 199 and the RG 200. The wireless RCs transmit the channel select commands to a Remote Antennae Package (RAP) 900 which is connected to each remotely located TV 199. The RAP 900 is a passive device for receiving and transmitting the wireless signal. The RAP 900 includes an antenna 910, such as a ¼ wave dipole *antenna*, located in close proximity to the TV 199, and preferably mounted to the TV 199. A wireless RC 500, such as a UHF RC, is used to select a *channel*. The wireless RC 500 transmits a wireless signal at one of the standard wireless transmission *frequencies*, such as 433 MHz. The wireless signal is a modulated signal that includes the channel select commands. The FCC regulations for wireless RCs imposes a maximum transmit power of 80.5 dbu V/m at a distance of 3 meters. One such wireless RC 500 that can be used along with the current invention is the RCK-431N manufactured by DAE-Ryung. The antenna 910 receives the channel select command and the RAP 900 transmits the wireless signal over the media 210 (i.e., coaxial cable) or the media 210 and the splitter 177.

A Remote Antenna Module (RAM) 920 which is located near, and preferably connected to the RG 200, receives the wireless signal. The RAM 920 demodulates the wireless signal and extracts the channel select command therefrom. In a preferred embodiment, the channel select command is extracted as an approximately 1 KHz audio signal. The RAM 920 then transmits the channel select command to the RG 200 for processing. The RAM 920 may be connected to the RG 200 with, for example audio wire better known as "speaker wire". In an alternative embodiment, the RAM 920 may be an integral part of the RG 200. In another embodiment, the RAM 920 may be mounted on the RG 200.

Figure 7:
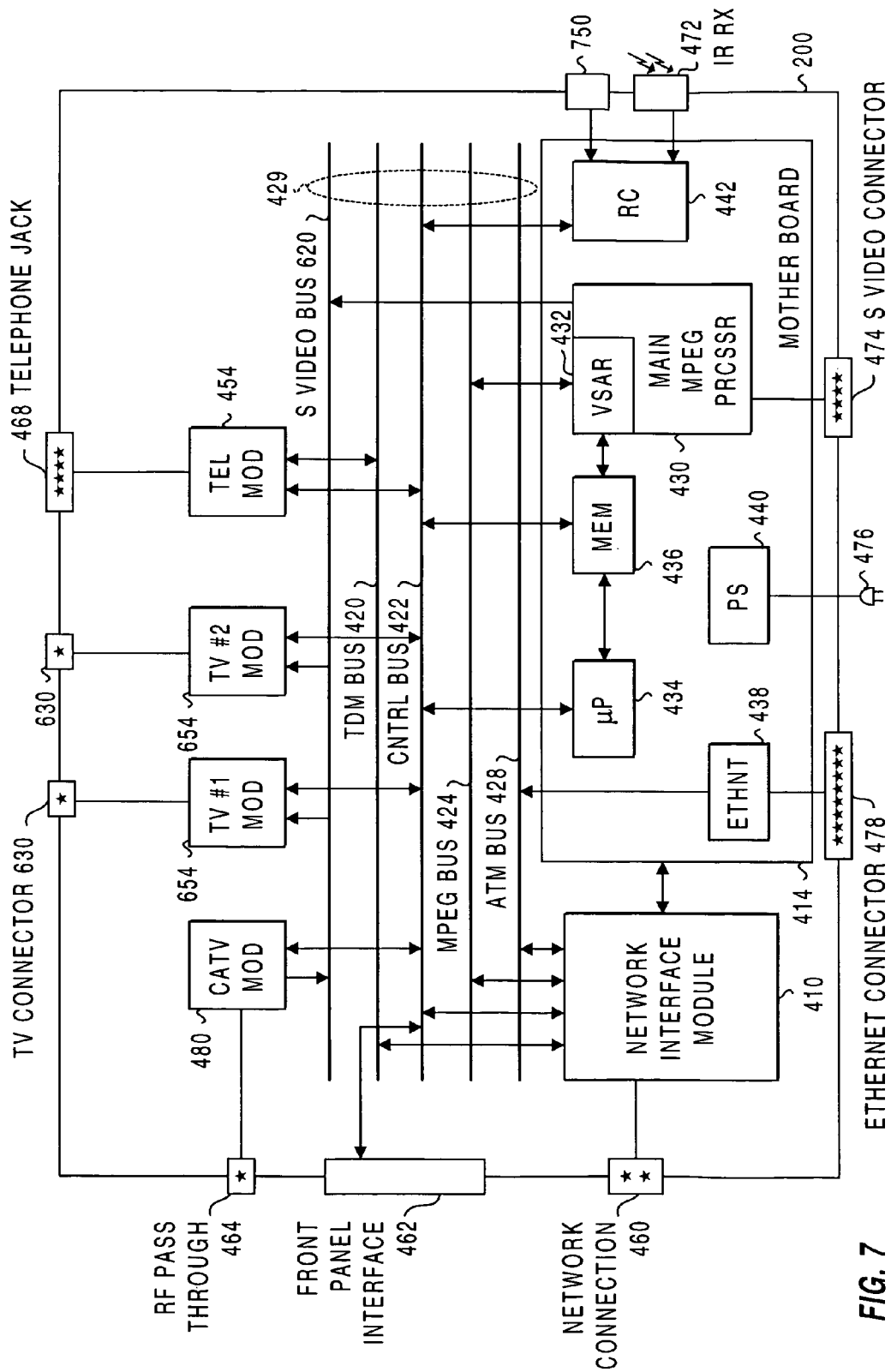
FIG. 7 illustrates an RG architecture, according to one embodiment.

FIG. 7 illustrates an embodiment of the RG 200 that includes a port 750 for receiving channel select commands from the RAM 920. The channel select commands are provided directly to the RC processor 442. In this embodiment, a wireless antennae is not required to receive the wireless signals. Moreover, this embodiment includes multiple ports 630, such as TV connectors. Thus, the combiner 418 of FIG. 5 is not required. Rather, this embodiment illustrates TV modules 654 for modulating the appropriate video channel over the appropriate port 630.

In addition, to transmitting TV signals from the RG 200 and wireless signals from the RAPs 900, the media 210 can be used to transport other signals. For example, the media 210 can be used to transport network signals between the telecommunications network and the RG 200. In order to transport network signals, diplexers are needed to insert and extract the signals from the media, and baluns are needed to adjust the impedance of the signals.

Figure 8:
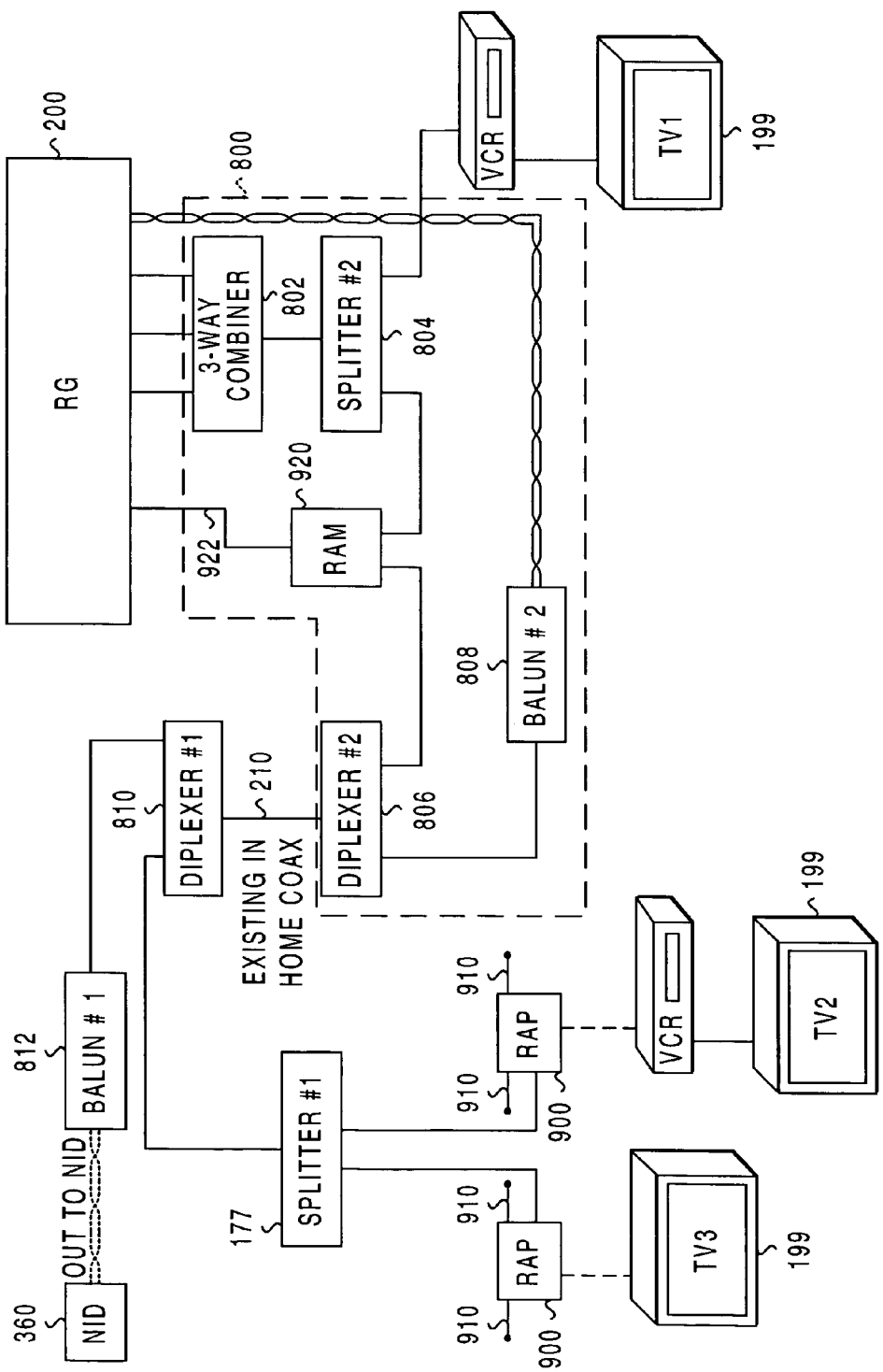
FIG. 8 illustrates the connections between the RG and various other components, according to one embodiment.

FIG. 8 illustrates one embodiment of an RG system utilizing the RAP 900 and the RAM 920 for communications between the RG 200 and the remotely located TVs 199 in addition to the use of diplexers and baluns to transmit network signals over the media 210. In this embodiment, three TV signals are modulated over three separate channels via three separate ports in the RG 200. The three TV signals are combined into one combined TV signal by using a combiner 802. The combined TV signal is then split into two signals by splitter 804 so that the combined TV signal can be transmitted to a TV 199 in close proximity to the RG 200 and to the remotely located TVs 199. In this embodiment, the combined TV signal is transmitted to a VCR connected to the TV 199 in close proximity to the RG 200. As illustrated, the TV 199 located in close proximity to the RG 200 is not receiving S-video signals, but instead is receiving the same format of signals as the remotely located TVs 199. As discussed earlier, the format of these TV signals may be the NTSC format currently used in the U.S. As would be obvious to those skilled in the art, if the TV 199 located in close proximity to the RG 200 was receiving the TV signals as an S-video signal out of the S-video port, the splitter 804 would not be required.

The combined TV signal being transmitted to the remotely located TVs 199 may be passed through the RAM 920. The RAM 920 will not perform any processing on the combined TV signals. The combined TV signal may then connect to a diplexer 806 located in close proximity to the RG 200. Thus, the other signals, such as VDSL signals from the telecommunications network, may be transmitted over the same media 210 that connects the RG 200 to the remotely located TVs 199. The media 210 is illustrated as coaxial cable 210 in FIG. 8. In order for the other signals to be transmitted over the same media 210, the other signals need to be passed through a balun 808 located in close proximity to the RG 200. The balun 808 adjusts the impedance of the other signals so that it can be transmitted over the same media 210. For example, as illustrated the digital signals being transmitted between the telecommunications network and the RG 200 are transmitted over twisted wire pair cables. Thus in this embodiment, the balun 808 provides the necessary impedance matching to allow the 100 ohm VDSL signal received from the digital network to be carried over the existing 75 ohm in home coaxial cable 210.

The combined TV signal and the other signals are then transmitted over the common media 210, such as in-home coaxial cable, to a remote location within the residence 190. A diplexer 810 is located at the remote location to remove the other signals from the media. A balun 812 is used to adjust the impedance of the other signals so that they can be transmitted over the twisted wire pair cables to the telecommunications network. The combined TV signal is then split by the splitter 177 so that it can be provided to multiple remotely located TVs 199. As illustrated the combined TV signal is provided to the RAP 900. However, the RAP 900 does not perform any processing on the combined TV signal. Each of the remotely located TVs 199 then displays the TV signal for the channel that was selected for viewing.

When the viewer of one of the remotely located TVs 199 decides to change channels, the viewer programs a wireless RC which transmits wireless signals, such as UHF signals, to the RAP 900. The RAP 900 receives the wireless signal, which includes the channel select command, and transmits the wireless signal downstream over the media 210 (i.e., coaxial cable). The wireless signals received from the multiple remotely located TVs 199 are combined at the splitter 177 onto the media 210. Downstream signals from the telecommunications network may be transmitted over the same media 210 using the balun 812 to adjust the impedance of the signals and the diplexer 810 to transmit the signals over the media 210. When the downstream signals are in the vicinity of the RG 200, the diplexer 806 removes the other signals from the media 210 and provides them to the balun 808 so that the impedance can be adjusted and the other signals can be provided to a network input of the RG 200. The wireless signals are provided from the diplexer 806 to the RAM 920 where the channel select command is extracted and modulated to the RG 200. As illustrated the channel select commands are modulated to the RG 200 over speaker wire 922. The channel select commands are not provided to the splitter 804.

As should be apparent, numerous connections are required to install the configuration of FIG. 8. That is, the combiner 802 needs to be connected to the RG 200, the splitter 804 needs to be connected to the combiner 802, the RAM 920 needs to be connected to the splitter 804, the diplexer 806 needs to be connected to the RAM 920, the RAM 920 needs to be connected to the RG 200, the balun 808 needs to be connected to the RG 200, and the diplexer 806 needs to be connected to the balun 808. The dotted line on FIG. 8 illustrates the components that can be replaced by a single device, in an alternative embodiment. The alternative embodiment utilizes a Media Interface Device (MID) 800, such as a coaxial interface device, that includes the combiner 802, the splitter 804, the diplexer 806, the balun 808, and the RAM 920 and can be mounted directly on the RG 200. Utilizing the MID 800 reduces the number of independent devices and the number of cables required for installation of the configuration illustrated in FIG. 8.

Figure 9:
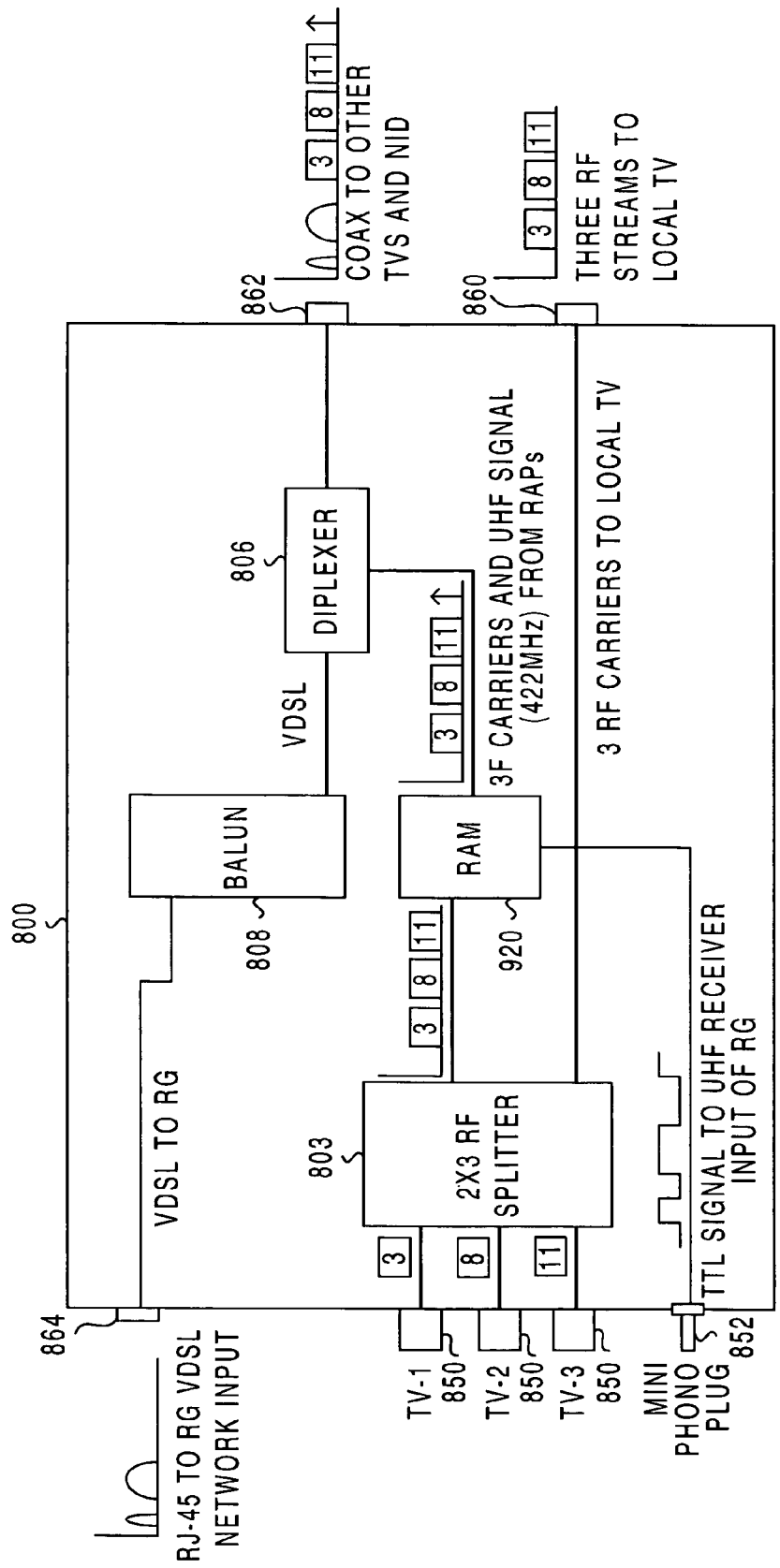
FIG. 9 illustrates the components of a Media Interface Device (MID), according to one embodiment.

FIG. 9 illustrates a schematic of the MID 800. The MID 800 includes multiple connectors, a 2×3 RF splitter 803, a RAM 920, a diplexer 806, a balun 808 and associated connections between the devices as illustrated. The MID 800 performs all the functions previously described above for each of the individual components. The multiple connectors include five connectors for connecting to the RG 200: three video connectors 850, such as coaxial connectors; a connector 852 for the channel select command, such as an audio pendant; and a connector 864 for connecting the telecommunications network to the RG 200, such as a RG-45 pendant. The multiple connectors also include two connectors for connecting to other devices: a connector 860, such as coaxial connector, for the local TV 199; and a connector 862, such as a coaxial connector, for the remote devices.

The channel numbers illustrated in FIG. 9 are examples of the channels that are assigned to each TV. The TV signals associated with each TV being modulated onto the coaxial cable at the frequency of the assigned channel. As illustrated the assigned channels are 3, 8 and 11. These channels are simply for illustrative purposes and are not intended to limit the scope of the invention.

Figure 10:
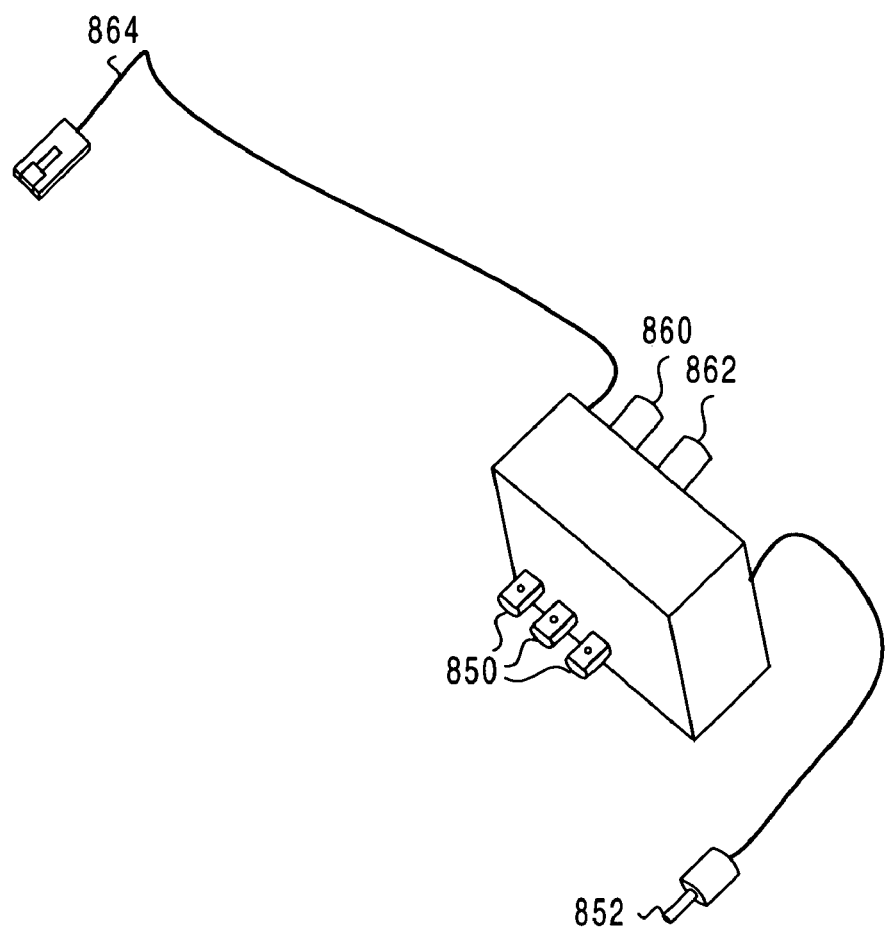
FIG. 10 illustrates the housing of the MID, according to one embodiment.

FIG. 10 illustrates one embodiment of the housing of the MID 800. As illustrated the MID 800 includes three video connectors 850 which would be adequately spaced so that the MID 800 could be directly attached to the connectors on the RG 200. The MID 800 also includes the two connectors 860, 862 for the local TV 199 and the remotely located devices, as well as a pendant 864 for connecting the MID 800 to the network input of the RG 200 and a pendant 852 for connecting to the channel select command port, audio port, of the RG 200. The MID 800 may have a die cast housing, and is preferably die cast from tin plated zinc. The MID 800 should be produced so as to shield the various modules within the MID 800 from each other and external radiation. All of the coaxial connectors should be built into the housing.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A media interface device for directional distribution of signals to multiple devices over a media, the media interface comprising:
   a first connector for receiving a first signal in a first direction;
   a second connector for receiving a second signal in the first direction and transmitting a third signal in a second direction;
   a third connector for transmitting the first signal and the second signal over the media in the first direction and receiving the third signal and a fourth signal over the media in the second direction;
   a diplexer for extracting the third signal from the media in the second direction and inserting the second signal onto the media in the first direction;
   a remote antennae module for receiving the fourth signal and extracting a fifth signal therefrom; and
   a fourth connector for transmitting the fifth signal in the second direction; and
   an X by Y splitter and additional connectors, wherein X and Y are integers, said first connector includes Y connectors and the first signal includes Y signals, each Y signal associated with a respective Y connector, and said X by Y splitter combines the Y signals to form a combined signal and splits the combined signal into X identical combined signals, said third connector transmits the combined signal and the second signal over the media in the first direction, and said additional connectors transmit the combined signal in the first direction.

2. A media interface device for connecting to a residential gateway and distributing signals to and from the residential gateway over a media, the media interface comprising:
- a first connector for receiving and transmitting signals over a media, the received signals including wireless signals from wireless remote control devices associated with remotely located TVs and downstream network signals from a telecommunications network, the transmitted signals including TV signals and upstream network signals;
- a second connector for receiving the TV signals from the residential gateway;
- a third connector for receiving the upstream network signals from the residential gateway and transmitting the downstream network signals to the residential gateway;
- a diplexer, connected to said first connector, for extracting the downstream network signals from the media and inserting the upstream network signals onto the media;
- a balun, connected to said diplexer, for adjusting the impedance of the upstream network signals so they can be inserted onto the media by said diplexer, and for adjusting the impedance of the downstream network signals so they can be processed by the residential gateway; and
- a remote antennae module, connected to said diplexer, for extracting the channel select commands from the wireless signals and transmitting the channel select commands to the residential gateway, and
- an X by Y splitter and X-1 additional connectors, wherein X and Y are integers, said second connector includes Y connectors each receiving a respective TV signal, said X by Y splitter combines the respective TV signals to form a combined TV signal and splits the combined signal Into X identical combined TV signals, said diplexer inserts the upstream network signals onto the media with the combined TV signal, and said combined TV signal is provided to the X-1 additional connectors.

3. A system for receiving and decoding signals from a telecommunications network and transmitting the decoded signals to a plurality of devices including multiple televisions, comprising:
- a residential gateway, comprising
  - a network interface module for transmitting upstream signals, including channel select commands, to the telecommunications network and receiving downstream signals, including video signals, from the telecommunications network; and
  - a video processor for decoding the video signals into at least one television signal corresponding to at least one channel select command, and transmitting the at least one television signal directly to the corresponding television;
- a remote antennae package located in close proximity to and connected to a remotely located television, said remote antennae package receiving a wireless signal, including a channel select command, from a wireless remote control device associated with the remotely located television and modulating the wireless signal over media; and
- a media interface device connected to the media and the residential gateway for demodulating the wireless signal, extracting the position corresponding to the channel select command, and transmitting the channel select command to the residential gateway, wherein said media interface device includes:
  - a remote antennae module for extracting the channel select commands from the wireless signal;
  - a splitter for splitting the at least one TV signal, so that the at least one TV signal can be provided to multiple locations;
  - a balun for adjusting the impedance of network signals to and from the telecommunications network so that they can be transmitted over the media; and
  - a diplexer for extracting from the media network signals from the telecommunications network and inserting onto the media network signals from the residential gateway.

4. The system of claim 3, wherein said media Interface device further includes a combiner for combining the at least one TV signal into a combined TV signal and said splitter splits the combined TV signal.

* * * * *